United States Patent
Pic

(10) Patent No.: US 9,934,457 B2
(45) Date of Patent: Apr. 3, 2018

(54) METHOD OF SECURING A TWO-DIMENSIONAL BARCODE

(71) Applicant: SURYS, Marne la Vallée (FR)

(72) Inventor: Marc Pic, Boulogne Billancourt (FR)

(73) Assignee: SURYS, Marne la Vallée (FR)

( * ) Notice: Subject to any disclaimer, the term of this patent is extended or adjusted under 35 U.S.C. 154(b) by 0 days.

(21) Appl. No.: 15/290,340

(22) Filed: Oct. 11, 2016

(65) Prior Publication Data

US 2017/0103293 A1     Apr. 13, 2017

(30) Foreign Application Priority Data

Oct. 8, 2015   (EP) .................................... 15306594

(51) Int. Cl.
| | | |
|---|---|---|
| G06K 19/00 | (2006.01) | |
| G06K 19/06 | (2006.01) | |
| G06K 19/10 | (2006.01) | |
| G06K 7/14 | (2006.01) | |

(52) U.S. Cl.
CPC ..... *G06K 19/06037* (2013.01); *G06K 7/1417* (2013.01); *G06K 7/1447* (2013.01); *G06K 19/06112* (2013.01); *G06K 19/10* (2013.01)

(58) Field of Classification Search
USPC ................................ 235/435, 439, 454, 462
See application file for complete search history.

(56) References Cited

U.S. PATENT DOCUMENTS

| | | |
|---|---|---|
| 8,297,510 B1 | 10/2012 | Yakshtes et al. |
| 2013/0015236 A1 | 1/2013 | Porter et al. |
| 2014/0061293 A1* | 3/2014 | Jayaprakash ..... G06F 17/30879 235/375 |
| 2014/0224879 A1* | 8/2014 | Guigan ................ G07D 7/0006 235/462.06 |

FOREIGN PATENT DOCUMENTS

| | | |
|---|---|---|
| WO | WO 2015/067592 | 5/2015 |
| WO | WO 2015/067725 A1 * | 5/2015 |

* cited by examiner

*Primary Examiner* — Matthew Mikels

(74) *Attorney, Agent, or Firm* — Occhiuti & Rohlicek LLP

(57) ABSTRACT

A method of securing a redundant initial two-dimensional barcode includes providing an initial message having a unique identifier, encoding the initial message as a set of predefined symbols so as to generate a redundant initial two-dimensional barcode having a redundant zone, generating a unique secret character string having a predefined fixed size, encoding the unique secret character string as a set of predefined symbols identical to the symbols used to generate the redundant initial two-dimensional barcode, and inserting the encoded unique secret character string into a redundant zone of the redundant initial two-dimensional barcode, each symbol of said encoded unique secret character string having a predefined position, so as to create a final two-dimensional barcode.

20 Claims, 2 Drawing Sheets http://www.mysite.com/sub/unique_identifier

0100100001100100101000100000101 http://www.mysite.com/sub/unique_identifier
FIGURE 1A
01001000011001001010001000101
FIGURE 1B
| redundancy | message | redundancy | other |
|---|---|---|---|
| 0010100010000101 | 01001000011001001010001000101 | 01001000011001 | 000011001 |
FIGURE 1C
FIGURE 1D
FIGURE 1E
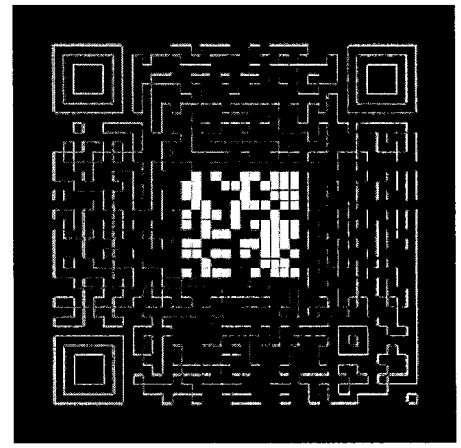
FIGURE 1F

METHOD OF SECURING A TWO-DIMENSIONAL BARCODE

RELATED APPLICATIONS

This application claims the benefit of the Oct. 8, 2015 priority date of European application EP 15306594.1, the contents of which are herein incorporated by reference.

FIELD OF DISCLOSURE

This disclosure relates to two-dimensional barcodes, and in particular, to securing and authenticating a two-dimensional barcode.

BACKGROUND

Any initial message comprising alphanumeric characters can be encoded as a two-dimensional barcode.

Accordingly, there is a correspondence between an initial message and a corresponding two-dimensional barcode that embeds the initial message.

The properties of the two-dimensional barcode, such as its dimension, depend on the length of the initial message, i.e. the number of alphanumeric characters.

Today, two-dimensional barcode types, such as e.g. PDF417, DataMatrix, QR-Code, Aztec Code, MaxiCode, Codablock F etc., are widely used for various reasons.

Typically, an initial message can comprise at least part of a uniform resource identifier or a path. Scanning a two-dimensional barcode that embeds this initial message will hyperlink to a web page corresponding to that uniform resource identifier or path, depending on the scanning software parameters.

The initial message, and hence its corresponding two-dimensional barcode, can be generic or unique.

For instance, a generic initial message is useful for commercial purposes or for identifying a batch of products. But such a message is useless for identifying a given product, even within a batch.

For instance, a unique initial message can be used for identifying a unique product on which a corresponding unique two-dimensional barcode is affixed to or is embedded in. In that case typically, the initial message contains a unique identifier.

SUMMARY

To preserve the uniqueness property of a unique two-dimensional barcode, there exists a need to secure such two-dimensional barcode.

In that context, the present invention relates, according to a first of its objects, to a method of securing a two-dimensional barcode. Such a method includes providing an initial message comprising a unique identifier (ID), and encoding that initial message as a set of predefined symbols so as to generate a redundant initial two-dimensional barcode that has at least one redundant zone.

Accordingly, a redundant initial two-dimensional barcode can be provided or generated by any standard two-dimensional barcode generator.

In some practices, the method further comprises generating a unique secret character string having a predefined fixed size, encoding the unique secret character string as a set of predefined symbols identical to the symbols used to generate the redundant initial two-dimensional barcode, and inserting the encoded unique secret character string in at least one redundant zone of the redundant initial two-dimensional barcode, each symbol of the encoded unique secret character string having a predefined position, so as to create a final two-dimensional barcode.

Accordingly, the present invention secures a two-dimensional barcode with a technique that is similar to steganography, which is a technique that involves concealing a unique secret character string.

Advantageously, when the unique secret character is inserted within a redundant zone, the present invention does not compromise the readability of the initial message in the final two-dimensional barcode using any standard application software. When a final two-dimensional barcode is read (i.e. scanned) by standard two-dimensional barcode reading application software, the initial message is decoded and no alert is generated, but the unique secret character cannot be retrieved because it is considered as an error.

In some practices, the method further includes providing the initial two-dimensional barcode with at least one redundant zone, and inserting the unique secret character string in that redundant zone. As a result of this feature, the insertion of the secret character string does not alter the initial message.

In one practice of the invention, the redundant initial two-dimensional barcode includes a unique redundant zone, and inserting the unique secret character string comprises inserting the unique secret character string within the unique redundant zone.

In another practice, the redundant initial two-dimensional barcode has several redundant zones. In this practice, inserting the unique secret character string includes either inserting the unique secret character string within a predefined redundant zone, or inserting the unique secret character string within a plurality of the redundant zones.

Because of secret zone's known shape and position, it is easier to decode the two-dimensional barcode once it has been printed or displayed.

In one embodiment, the step of encoding the unique secret character string comprises the step of encoding the unique secret character string in a redundant manner. As a result of this feature, the secret character string can be more easily retrieved even if the printed two-dimensional barcode has been altered.

In another practice, inserting the unique secret character string in at least one secret zone of the initial two-dimensional barcode comprises replacing, in the secret zone(s) of the initial two-dimensional barcode, an existing predefined symbol coding the initial message with a predefined symbol of the unique secret character string, for each predefined symbol of the unique secret character string.

Another practice of the inventive method includes computing the length of the unique secret character string as a function of either the initial two-dimensional barcode's type, its size, the final two-dimensional barcode's level of redundancy, or the initial message's length.

Among other practices of the inventive method or those that include printing the final two-dimensional barcode and those that include displaying the final two-dimensional barcode on a display screen.

As a result of this feature, the final two-dimensional barcode can be affixed to a support, e.g. an industrially manufactured product, including as a label.

In another practice, the method further includes printing the final two-dimensional barcode and providing the printed final two-dimensional barcode with at least one optically variable device. As a result of this feature, the printed final two-dimensional barcode is secured against techniques such as photocopying.

In another practice, generating a unique secret character string further comprises either computing the unique secret character string independently from the initial message or computing the unique secret character string the unique secret character string in dependence of the initial message or of the unique identifier, as a result of a one-way function, or any cryptographic function, applied to the unique identifier, or applied to the initial message.

In another practice, the method further comprises a step of providing a Uniform Resource Identifier as at least part of the initial message. As a result of this feature, a final two-dimensional barcode according to the present invention can be implemented for instance for a B-to-B (i.e., business-to-business) or a B-to-C (i.e., business-to-consumer) campaign.

In another aspect, the invention features a method of authenticating a two-dimensional barcode that has a message and a unique identifier. Such a method includes scanning the two-dimensional barcode with an optical sensor, recording the digital image of the two-dimensional barcode obtained in a memory, decoding the digital image, and extracting from it both the extracted message and the extracted unique identifier it contains.

Among the practices of the method are those that include generating a regenerated two-dimensional barcode from the extracted message, and comparing the regenerated two-dimensional barcode with the digital image of the two-dimensional barcode recorded in a memory. Such regeneration avoids any connection with a remote database over a transmission communication network.

In another practice, the method further includes decoding, as a regenerated secret character string, the result of the comparison step, recording the regenerated secret character string in a memory, computing the result (ID_h) of a one-way function applied to the extracted unique identifier and recording the result in a memory, the one-way function preferably being the same as the one-way function used to generate the unique secret character string, and comparing the result (ID_h) with the regenerated secret character string.

The comparison step is a way to detect if the printed final two-dimensional barcode has been altered, for example by having been tampered with.

In another practice, scanning the two-dimensional barcode comprises providing, as the two-dimensional barcode, a final two-dimensional barcode according to the first object of the present invention.

Yet another practice includes generating a regenerated two-dimensional barcode with the same generator or algorithm used to generate the initial two-dimensional barcode.

In another aspect, the invention features a non-transitory computer-readable medium having encoded therein instructions for causing one or more digital computers to execute any of the foregoing methods.

As a result of the techniques described herein, it becomes possible to identify a product physically associated with a two-dimensional barcode and to improve protection against forgery or counterfeiting of that product. In particular, 2D-barcode readability by standard methods and software applications remains available while a dedicated software application according to the present invention will be able to recognize a fake or counterfeit product.

The present invention aims to prevent unauthorized generation of two-dimensional barcodes that are intended to identify false products within a distribution channel.

The present invention can be implemented with no access to any database.

BRIEF DESCRIPTION OF THE DRAWINGS

These and other features will be apparent from the following detailed description and the accompanying figures, in which:

FIG. 1A illustrates a unique initial message comprising a unique identifier,

FIG. 1B illustrates the unique initial message of FIG. 1A in digital form,

FIG. 1C illustrates a data matrix comprising the initial message of FIG. 1A and redundancies of the initial message of FIG. 1A, FIG. 1D illustrates an initial two-dimensional barcode corresponding to the unique initial message of FIG. 1A, FIG. 1E illustrates a final two-dimensional barcode corresponding to the unique initial message of FIG. 1A, FIG. 1F illustrates the difference between the initial two-dimensional barcode of FIG. 1D and the final two-dimensional barcode of FIG. 1E.

DETAILED DESCRIPTION

Figure 2:
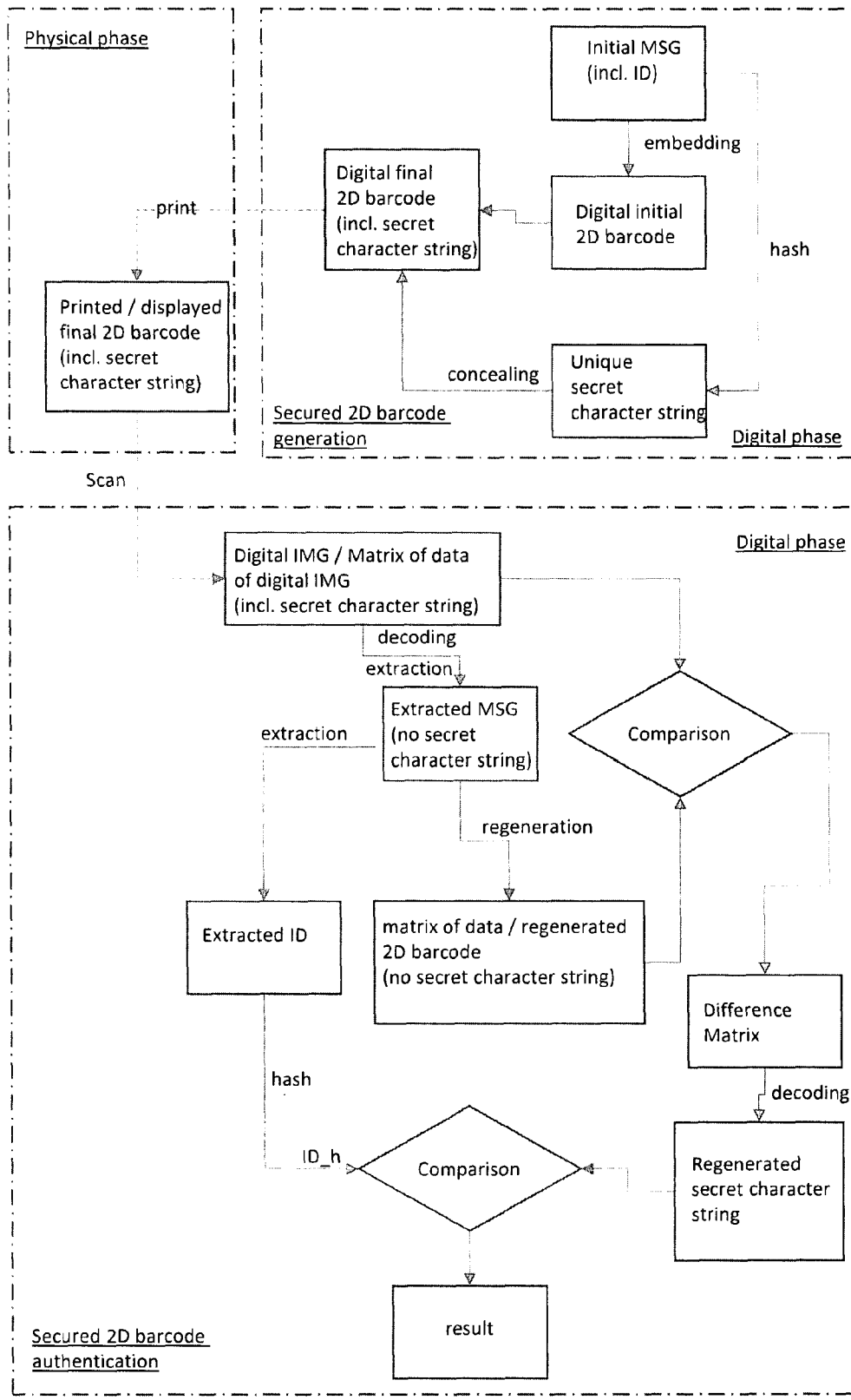
FIG. 2 illustrates one practice of a method as described herein.

FIG. 1A shows an initial message in its clear form, in which it is readable by a human being. The same message in digital form is shown in FIG. 1B. In this digital form the initial message comprises a bit sequence that is readable by a machine. Therefore, as there is a unique correspondence between an initial message in its clear form, shown in FIG. 1A, and its digital form, shown in FIG. 1B. As a result, an "initial message" according to the present description indistinctively relates to the initial message in its clear form or in its digital form.

An initial message is not limited to a URL as shown in FIG. 1A. For example, an initial message can include a sequence of alphanumeric or kanji characters.

The methods and systems described herein relate to any type of two-dimensional barcode provided that the two-dimensional barcode is redundant, i.e. in which at least parts (bits) of the initial message are redundant. Because actual two-dimensional barcodes are designed to resist alterations related to manipulations, most barcode standards have a protocol that implements at least one redundancy level.

The apparatus and methods described herein are not limited to two-dimensional barcodes to be affixed to a container. They can also be used in connection with D barcodes that can be physically associated with any support, e.g. affixed to or inserted into the support. Such two-dimensional barcodes include those that are on labels.

An "initial message" according to the present invention contains a unique identifier and is therefore considered to be unique. Thus, for the sake of conciseness, a "unique" initial message will be referred to as simply an "initial message".

To promote brevity, the only example described herein relates to an initial message being a URL having, as its corresponding two-dimensional barcode, a QR code. Such a code is then affixed to a container, such as a food container. However, the methods and systems described herein are neither limited to such types of two-dimensional barcodes, nor limited to such uses of two-dimensional barcodes.

The term "two-dimensional barcode" refers to a graphical representation, such as that shown in FIG. 1D, that can be displayed or printed, or its corresponding matrix of digital data, as shown in FIG. 1C.

Two-Dimensional Barcodes

The apparatus and methods described herein promote the protection of two-dimensional barcodes against forgery, as soon as they include redundancy, as described herein.

The initial message is embedded in a two-dimensional barcode. Therefore, there is a unique correspondence between the initial message, its corresponding two-dimensional barcode, and its corresponding data matrix. Because the initial message is normally unique, the corresponding two-dimensional barcode is normally also unique.

In a two-dimensional barcode, the initial message is encoded as a set, or grid, of elementary predefined symbols. These symbols can be binary, such as the black and white squares, or modules, in a QR code or data matrix. The symbols can also be n-ary, such as colored triangles in the high-capacity colored barcode.

In a two-dimensional barcode, any one of a number of parameters can be chosen or predefined. These include the grid size, the total number of elementary predefined symbols, the density, the number of elementary predefined symbols per unit area, the printed or displayed size of each elementary predefined symbol, the number of elementary predefined symbol possible colors, such as two in black and white, or any two colors, in a QR code or data matrix, or more than two, such as the number of colors used in a high-capacity colored barcode.

In the example shown in FIG. 1A, the initial message is a URL. This is an address of a specific web site, page, or file on the Internet. The unique identifier is a part of the URL. In some practices, the unique identifier is a unique number that permits identification of the particular container upon which the two-dimensional barcode has been affixed.

The method includes generating an initial 2D barcode from the initial message, as shown in FIG. 1D. Such a barcode can be generated using a conventional two-dimensional barcode generator. This initial two-dimensional barcode is then stored, or recorded, in a memory.

Unique Secret Character String

This is followed by generating a unique secret character string. The size of the unique secret character string is less than or equal to a predefined fixed size. Examples of a secret character string include, but are not limited to, a database index, a product code, and an identifier.

In some embodiments, the size, or length, of the secret character string is a function of any one or more of the two-dimensional barcode's type, its level of redundancy, its size, the initial message's length, and the length its data.

One practice of the method includes generating the unique secret character string independently of the unique initial message. In such a practice, the secret character string is not computed as a function of the initial message and not computed as a function of the unique identifier. An example of a function that is used to compute the secret character string is a constant function.

Some practices of the method feature generating the unique secret character string in a manner that depends on the initial message or on the unique identifier. These practices include generating it as a function of the initial message or of the unique identifier respectively.

In other practices, the unique secret character string results from application of a hash function applied to either the unique identifier or to the unique initial message.

Other practices include computing the unique secret character string as a function of the initial message or of the unique identifier respectively, together with another element. Examples of a suitable element include but are not limited to a constant number and a random number having a predefined length.

The apparatus and methods described herein are not limited to hash functions. They encompass any other one-way function or any cryptographic function that maps digital data of arbitrary size to digital data of fixed size.

Just as the initial message was encoded, the unique secret character string is also encoded. Practices of the method thus include encoding the unique secret character string as a set or grid of elementary predefined symbols. The elementary predefined symbols for the unique secret character string are the same type as the elementary predefined symbols used to generate the initial two-dimensional barcode. For example, if the initial two-dimensional barcode is a QR code the unique secret character string is encoded as a QR code. Alternatively, the initial two-dimensional barcode is a data matrix the unique secret character string is encoded as a data matrix.

The process continues with concealing the unique secret character string in a predefined area of the initial two-dimensional barcode within a predefined shape. This predefined area hereafter called the "secret zone." The result is the final two-dimensional barcode as shown in FIG. 1E.

In the final two-dimensional barcode, each predefined symbol of the unique secret character string replaces a corresponding existing predefined symbol in the secret zone of the initial two-dimensional barcode to generate the final two-dimensional barcode. Accordingly, because the length of the secret character string is quite small relative to the length of the data matrix of the initial two-dimensional barcode, the final two-dimensional barcode looks quite similar to its corresponding initial two-dimensional barcode.

FIG. 1F reveals the difference between the barcodes in FIG. 1D and FIG. 1E, as well as the location and shape of the secret zone. It is worth noting that the total number of predefined symbols in the secret zone is greater than or equal to the total number of predefined symbols encoding the unique secret character string.

Preferably, within the secret zone, the predefined symbols of the concealed unique secret character string are adjacent in pairs.

Some practices include encoding the unique secret character string in the secret zone of the initial two-dimensional barcode in a way that depends on the value of the existing predefined symbols in the secret zone. This means encoding the unique secret character string in the initial two-dimensional barcode by changing the value of each existing predefined symbol in the secret zone.

In those practices that rely on color as a value, this involves changing the color of each existing predefined symbol in the secret zone. For instance, for a colored two-dimensional barcode, such as a HCCB, encoding the unique secret character string can include changing the color of each existing predefined symbol in the secret zone of the initial two-dimensional barcode.

For a black and white two-dimensional barcode, such as a QR code, each predefined symbol is a binary value. In these practices, encoding the unique secret character string in the secret zone of the initial two-dimensional barcode includes replacing the value of each existing predefined symbol that corresponds to the unique secret character string by its opposite binary value. This results in forming a negative picture.

In other practices, encoding the secret character string in the secret zone of the initial two-dimensional barcode does not depend on the value of the existing predefined symbols in the secret zone.

Among the foregoing practices are those in which encoding the secret character string includes replacing, or overwriting, the value of each preexisting predefined symbol in the secret zone of the initial two-dimensional barcode by the value of the computed secret character string regardless of its preexisting value. In these practices, one or more predefined symbols in the secret zone may seem to not have been replaced in the transition from the initial two-dimensional barcode and the final two-dimensional barcode.

For instance, in some practices, the secret zone can be a rectangle of M*N predefined symbols. In such cases, it is possible to encode the secret character string on m*n predefined symbols with m<M, n<N, where M, N, m, and n are all natural numbers. In some cases, N equals M, and n equals to m.

Once the unique secret character string has been concealed in the secret zone, the final two-dimensional barcode is stored in a memory. It can then be printed, for example as a machine-readable optical label.

Redundancy

In some practices, the initial two-dimensional barcode contains at least one redundant zone. Each redundant zone corresponds to redundant data.

A redundant zone is an area in the initial two-dimensional barcode that has a set of predefined symbols that correspond to those parts of the initial message that have already been encoded in at least one other zone. Such repetition gives redundancy to the bits of the initial message.

In some cases, it is possible to choose a redundancy level (indistinctively level of robustness or error correction level). A higher level of redundancy promotes the two-dimensional barcode's resistance to interference from damage that may result from use. Examples of damage include smudges, torn edges, image overlays, and anything else that may interfere with the barcode's legibility. As a result of this redundancy, it remains possible to use the initial two-dimensional barcode if it has been partially damaged. For example, it may be possible for an optical sensor to still read it.

The apparatus and methods described herein advantageously can take benefit of this redundancy. For example, in some practices, the secret zone is in a redundant zone. This permits concealment of the unique secret character string in the two-dimensional barcode by altering only some of the redundant bits of the initial message. This preserves the bits of the initial message itself.

Some practices include choosing the length of the secret character string as a function of redundancy level. For instance, with a two-dimensional barcode being a rectangle having a width equal to A, a length equal to B, a level of redundancy equal to X %, and a secret zone having a shape of a rectangle having a width equal to W and a length equal to E, it is preferable that W be less than or equal to X*A, and that E be less than or equal to X*B.

The position of the secret zone and/or each of the predefined symbols of the secret character string is either known and can be predefined or chosen randomly. This promotes reliability and security of the final two-dimensional barcode.

In some practices, the secret zone is concentric with the center of the two-dimensional barcode.

In addition, the knowledge of the position of the secret zone is a security feature and a reliability feature.

Usually, the two-dimensional barcode contains position/orientation patterns, which are called "blocks." In such cases, it is preferable that the secret zone avoid overlapping any of these blocks.

The final two-dimensional barcode may further contain alignment patterns or timing patterns. Preferably, the secret zone does not overlap any of these alignment or timing patterns.

In some practices, the secret character string is redundant within the secret zone. It is also possible to generate several secret zones. In such cases, the secret character string or the secret character strings can be distributed, provided that the total size, in terms of the number of predefined symbols of the final two-dimensional barcode, is greater than a predefined number.

Scanning

An optical sensor scans the final two-dimensional barcode and records the resulting digital image of the final two-dimensional barcode into a memory. An exemplary optical sensor and memory are those found in a communication device. Examples of communication devices include a smartphone, a tablet, and a personal computer, each of which have processor, a memory, and the capability of establishing a communication, for example, via radio.

The digital image can be rectified.

The digital image comprises the encoded unique secret character string.

A decoder, whether implemented as software or otherwise, decodes the digital image. In doing so, it extracts from it both the message and the unique identifier.

Because the unique secret character string was encoded in a redundant zone, extracting the message from the digital image does not also extract the unique secret character string. In fact, the unique secret character string and cannot be extracted at all.

The extracted message does not contain the unique secret character string. Normally, for example if the printed final two-dimensional barcode has not been altered, the extracted message equals the initial message.

The extracted message, which comprises the unique identifier, is recorded in a memory.

The unique identifier is extracted from the extracted message and recorded in a memory.

Further, there is provided a step of generating a regenerated data matrix or a corresponding regenerated two-dimensional barcode from the extracted message, with the same generator/algorithm that was used to generate the initial two-dimensional barcode. Such a data matrix or two-dimensional barcode is stored in a memory. For clarity, this will be called "regenerated" data matrix or "regenerated" two-dimensional barcode here after.

The regenerated data matrix or the regenerated two-dimensional barcode is normally identical to the initial data matrix or the initial two-dimensional barcode respectively. Such regeneration avoids accessing a database where the initial data matrix or initial two-dimensional barcode would have to be recorded, and transferring them over a communication network.

The regenerated two-dimensional barcode differs from the final two-dimensional barcode, in that the final two-dimensional barcode does not contain the unique secret character string. It is normally identical to the regenerated two-dimensional barcode.

The regenerated data matrix differs from the final data matrix (i.e. the data matrix corresponding to the final two-dimensional barcode) in that the extracted data matrix lacks the unique secret character string. The regenerated data matrix is normally identical to the initial data matrix, i.e. the data matrix corresponding to the initial two-dimensional barcode.

The regenerated data matrix is compared with the final data matrix. Alternatively, the regenerated two-dimensional is compared with the final two-dimensional barcode.

Preferably, the comparison step comprises computing the difference between the extracted data matrix and the final data matrix.

The result of the comparison step is called here after a "difference matrix" which is decoded as a "regenerated secret character string."

The regenerated secret character string, which normally corresponds to the unique secret character string, is stored in a memory.

The result of a one-way function used to map digital data of arbitrary size to digital data of fixed size, e.g. a hash function, and applied to the extracted unique identifier is recorded in a memory. Such a one-way function is preferably the same as the one-way function that was used to generate the unique secret character string previously described. Such result is referred to herein as "ID_h."

It is then possible to compare ID_h with the regenerated secret character string, and to generate a signal, the meaning of which depends on the result of that comparison.

For instance, if the result equals zero, then ID_h is equal to the regenerated secret character string. This means that the final two-dimensional barcode, whether printed or digital, has not been altered. If so, then an "OK" signal is generated. On the other hand, if the result differs from zero, then a signal meaning "warning" can be generated.

Accordingly, there is no need to transfer the secret character string over a communication network.

Alterations of the printed final two-dimensional barcode can occur because of its normal use and its handling.

Alterations can also occur because of counterfeiting a final two-dimensional barcode. The apparatus and methods described herein enable detection of such counterfeit final two-dimensional barcodes.

Advantageously, all steps described in the scanning section here above can be implemented on the same device, e.g. on a communication device.

Alternatively, some of the steps can be implemented on a distant device, for instance a server, in communication with the communication device. This is advantageous because there is then no need to communicate the initial two-dimensional barcode from a database to the communication device. The apparatus and methods described herein can be implemented with just a communication device, as a stand-alone device.

EXAMPLE

In one illustrative and non-limiting example, the message is a uniform resource locator comprising a unique identifier that identifies a given product. A typical uniform resource locator might be "http://www.mywebsite.com/product/product_id/".

A first digital phase is implemented in a first context. An example of such a first context is a production process. This first digital phase includes embedding the message in an initial two-dimensional barcode. An example of such a barcode is a QR Code. It also includes applying a hash function is applied to the identifier, thus creating a unique secret character string, and concealing the unique character string in a redundant zone of the initial QR Code. This creates a final QR Code.

The final QR Code is generated and physically associated with a product. This can be carried out by applying it to a product, affixing it to a product, and/or embedding in a product. An example of a product is a food container.

Preferably, the unique identifier "product_id" identifies a unique product, in this case a unique container, rather than a batch of containers.

In a non-digital phase, the product, which can be a food container, is made available for use. This can be carried out, for example, by making it available at a factory, a warehouse, at a market, etc.

A second digital phase is implemented in a second context that can differ from the first context. For example, the second context may be a production process, a logistic process, a commercial process, etc. The second digital phase includes having a scanner scan the final QR Code. This can be carried out using a scanning application downloaded on a communication device.

A digital image IMG comprising the unique secret character string is recorded in a memory of the communication device.

The digital image is decoded as a data matrix from which the extracted message (not comprising the secret character string) is extracted.

The extracted message is normally the message as if it would have been without the unique secret character string. It is then encoded as an extracted data matrix, or regenerated two-dimensional barcode, which does not contain the unique secret character string.

The difference between this extracted data matrix and the data matrix of the digital image is computed as a difference matrix from which a regenerated secret character string is decoded.

From the extracted message, the unique identifier is extracted, on which a hash function is applied, the result of which being compared with the regenerated secret character string, the hash function being the same as the hash function used to generate the unique secret character string.

If the QR code has not been altered, then the result of the hash function equals the regenerated secret character string.

A corresponding message can be triggered and displayed on the display screen of the communication device. On the contrary, if the result of the hash function is not equal to the regenerated secret character string, a corresponding warning or alarm message or signal can be triggered or displayed on the display screen of the communication device. Further investigations can be implemented to identify the reason of the warning e.g. a physical alteration due to handling might be acceptable.

As a result of the methods and devices described herein, an authenticating method is provided which can be implemented with a stand-alone device such as a communication device that does not need to access any database.

As a complementary security feature, it can be provided to provide the printed final two-dimensional barcode with at least one optically variable device such as e.g. a holographic marker. Such feature enables protection against photocopying of the final two-dimensional barcode.

Further controls of the secret character string can be provided, for instance comparing the secret character string with a reference character string in a database, whether online or offline.

The methods and devices described herein provide an effective and yet simple way to secure unique two-dimensional barcodes, even without actually having to print an initial two-dimensional barcode.

Having described the invention, and a preferred embodiment thereof, what we claim as new, and secured by Letters Patent is:

1. A method comprising securing a redundant initial two-dimensional barcode, wherein securing a redundant initial two-dimensional barcode comprises providing an initial message, wherein said initial message comprises a unique identifier, encoding said initial message as a set of predefined symbols so as to generate a redundant initial two-dimensional barcode, wherein said redundant initial two-dimensional barcode comprises at least one redundant zone, generating a unique secret character string having a predefined fixed size, encoding said unique secret character string as a set of predefined symbols identical to said symbols used to generate said redundant initial two-dimensional barcode, and inserting said encoded unique secret character string into at least one redundant zone of said redundant initial two-dimensional barcode such that each predefined symbol of said unique secret character string replaces a corresponding existing predefined symbol that is in a secret zone of said initial two-dimensional bar code, each symbol of said encoded unique secret character string having a predefined position, so as to create a final two-dimensional barcode, wherein encoding said unique secret character string comprises encoding said unique secret character string in a redundant manner.

2. The method of claim 1, wherein said redundant initial two-dimensional barcode comprises a unique redundant zone, and wherein inserting said unique secret character string comprises inserting said unique secret character string within said unique redundant zone.

3. The method of claim 1, wherein said redundant initial two-dimensional barcode comprises several redundant zones, and wherein inserting said unique secret character string comprises inserting said unique secret character string within a predefined redundant zone.

4. The method of claim 1, wherein said redundant initial two-dimensional barcode comprises several redundant zones, and wherein inserting said unique secret character string comprises inserting said unique secret character string within a plurality of said redundant zones.

5. The method of claim 1, wherein inserting said unique secret character string in at least one of said initial two-dimensional barcode comprises replacing, in said regions of said initial two-dimensional barcode, an existing predefined symbol coding said initial message with a predefined symbol of said unique secret character string, for each predefined symbol of said unique secret character string.

6. The method of claim 1, further comprising computing a length of said unique secret character string as a function of at least a type of said initial two-dimensional barcode.

7. The method of claim 1, further comprising computing a length of said unique secret character string as a function of a level of redundancy of said final two-dimensional barcode.

8. The method of claim 1, further comprising computing said length of said unique secret character string as a function of a size of said initial two-dimensional barcode.

9. The method of claim 1, further comprising computing said length of said unique secret character string as a function of a length of said initial message.

10. The method of claim 1, further comprising printing said final two-dimensional barcode.

11. The method of claim 1, further comprising displaying said final two-dimensional barcode on a display screen.

12. The method of claim 1, further comprising printing said final two-dimensional barcode, said printed final two-dimensional barcode having been provided with at least one optically-variable device.

13. The method of claim 1, wherein generating a unique secret character string further comprises computing said unique secret character string independently from said initial message.

14. The method of claim 1, wherein generating a unique secret character string further comprises computing said unique secret character string based at least in part on said initial message or of said unique identifier as a result of at least one of a one-way function and a cryptographic function being applied to one of said unique identifier and said initial message.

15. The method of claim 1, further comprising providing a Uniform Resource Identifier as at least part of said initial message.

16. A method comprising securing a redundant initial two-dimensional barcode, wherein securing a redundant initial two-dimensional barcode comprises providing an initial message, wherein said initial message comprises a unique identifier, encoding said initial message as a set of predefined symbols so as to generate a redundant initial two-dimensional barcode, wherein said redundant initial two-dimensional barcode comprises at least one redundant zone, generating a unique secret character string having a predefined fixed size, encoding said unique secret character string as a set of predefined symbols identical to said symbols used to generate said redundant initial two-dimensional barcode, and inserting said encoded unique secret character string into at least one redundant zone of said redundant initial two-dimensional barcode, each symbol of said encoded unique secret character string having a predefined position, so as to create a final two-dimensional barcode, said method further comprising authenticating said final two-dimensional barcode, wherein said authenticating step comprises scanning said final two-dimensional barcode with an optical sensor, thereby obtaining a digital image thereof, recording said digital image of said final two-dimensional barcode in a memory, decoding said digital image, extracting, from said decoded digital image, both said extracted message and said extracted unique identifier contained by said extracted message, generating a regenerated two-dimensional barcode from said extracted message, and comparing said regenerated two-dimensional barcode with said digital image of said final two-dimensional barcode as recorded in said memory.

17. The method of claim 16, further comprising decoding a result of having compared said regenerated two-dimensional barcode with said digital image of said two-dimensional barcode as a regenerated secret character string, recording said regenerated secret character string, computing a result of having applied a one-way function applied to said extracted unique identifier, recording said result, and comparing said result with said regenerated secret character string, wherein said one-way function is the same as a one-way function used to generate said unique secret character string.

18. The method of claim 16, wherein generating a regenerated two-dimensional barcode from said extracted message comprises implementing a generator that was used to generate said initial two-dimensional barcode.

19. A manufacture comprising a non-transitory computer-readable medium having encoded therein program instructions that, when executed on a computer, cause execution of the method recited in claim 1.

20. The method of claim 12, wherein said optically variable device comprises a holographic marker.

\* \* \* \* \*